No. 702,262. Patented June 10, 1902.
S. B. TILY & J. G. & M. O. REHFUSS.
MACHINE FOR INSERTING AND FASTENING STRINGS IN LABELS.
(Application filed May 31, 1901.)
(No Model.) 7 Sheets—Sheet 1.
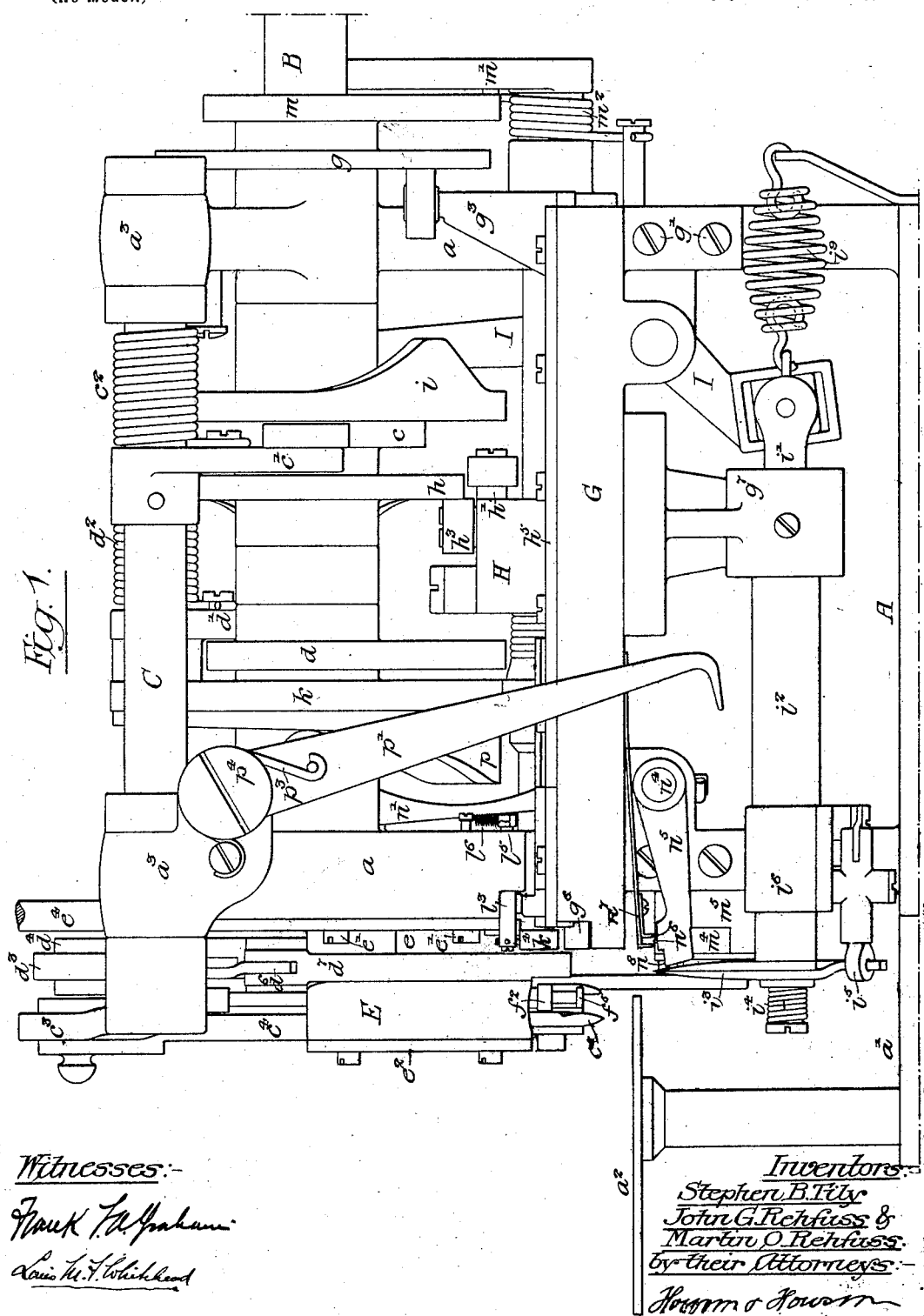
Witnesses:—
Inventors:—
Stephen B. Tily
John G. Rehfuss &
Martin O. Rehfuss.
by their Attorneys:—

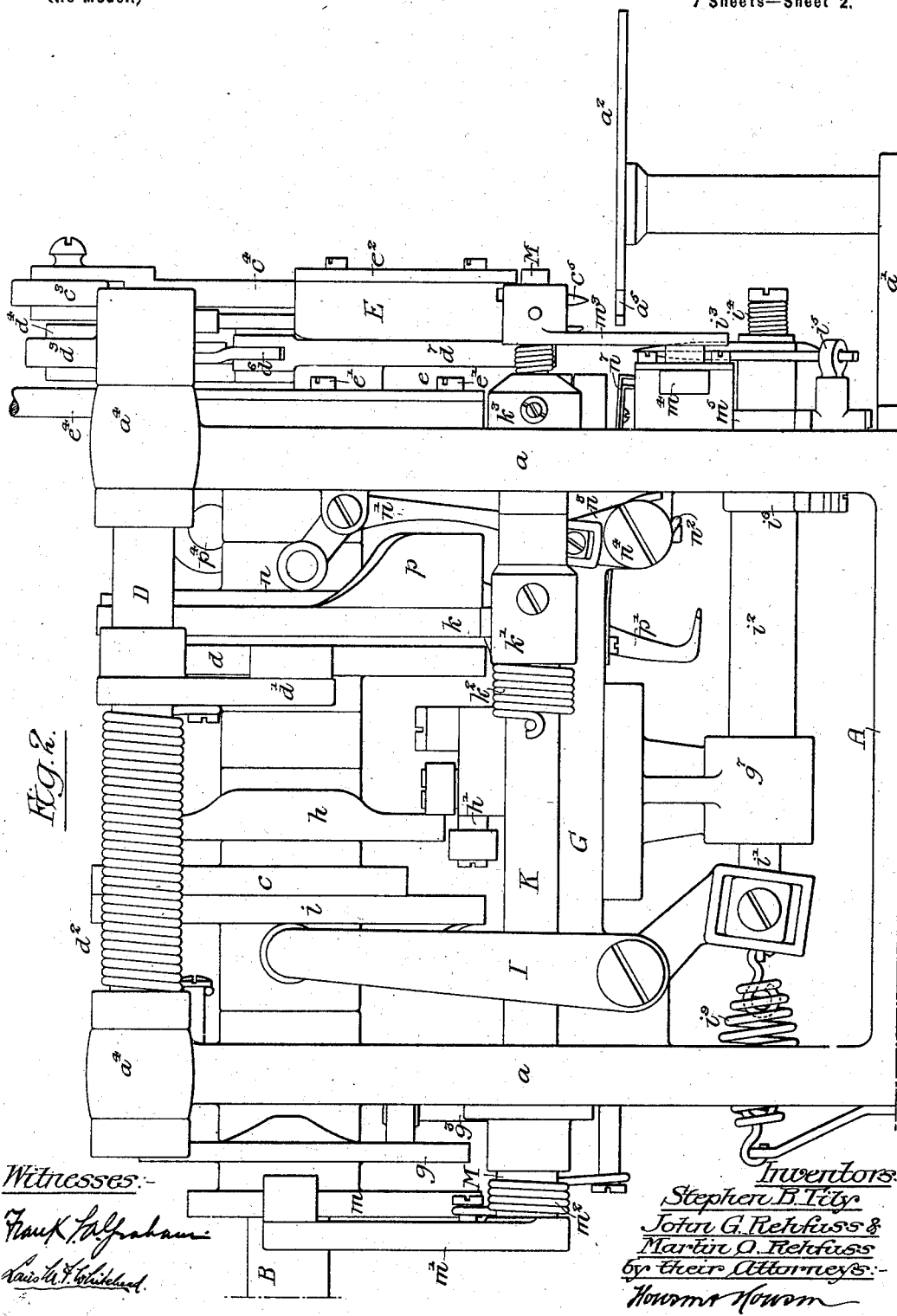

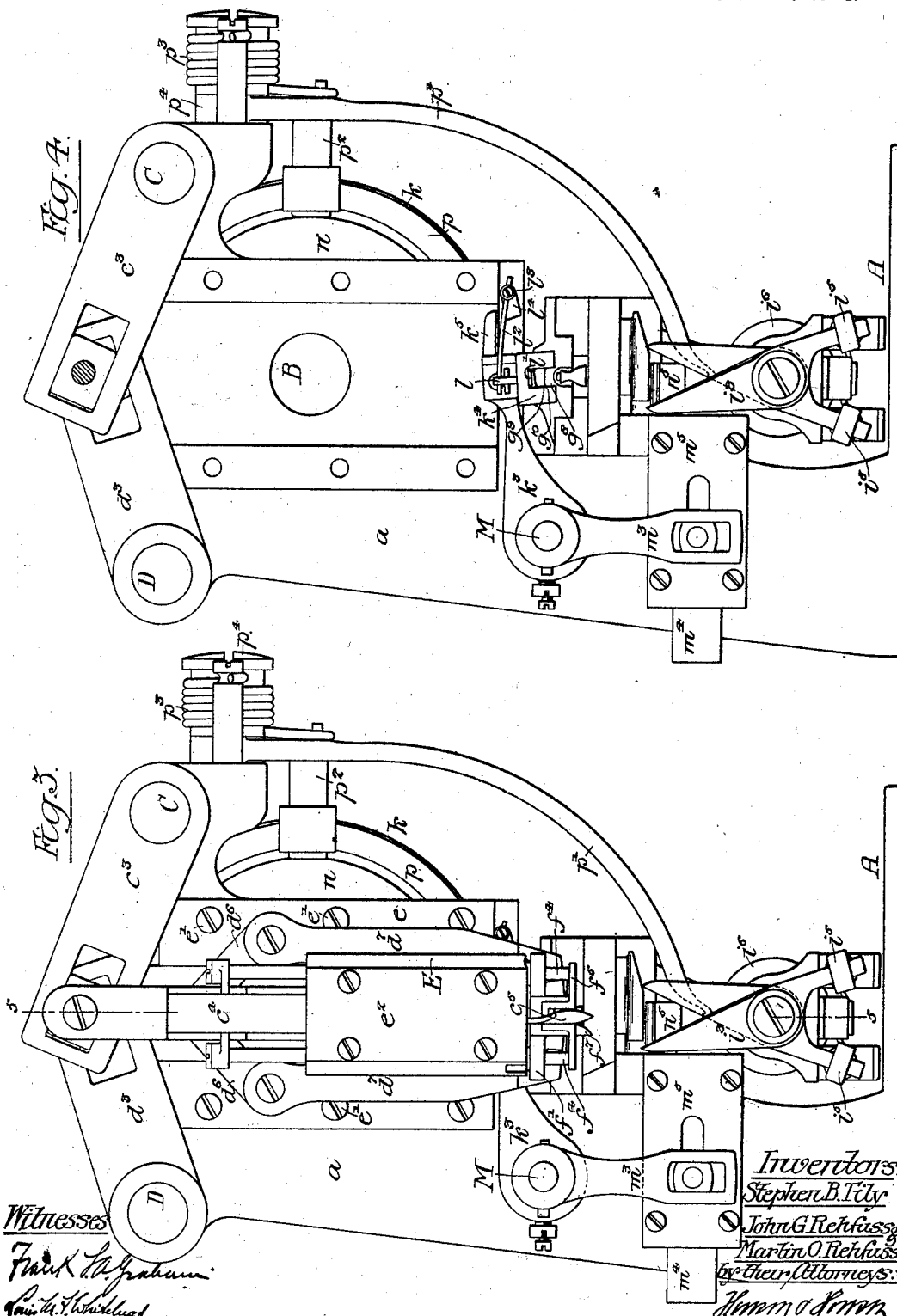

No. 702,262. Patented June 10, 1902.
S. B. TILY & J. G. & M. O. REHFUSS.
MACHINE FOR INSERTING AND FASTENING STRINGS IN LABELS.
(Application filed May 31, 1901.)
(No Model.) 7 Sheets—Sheet 4.
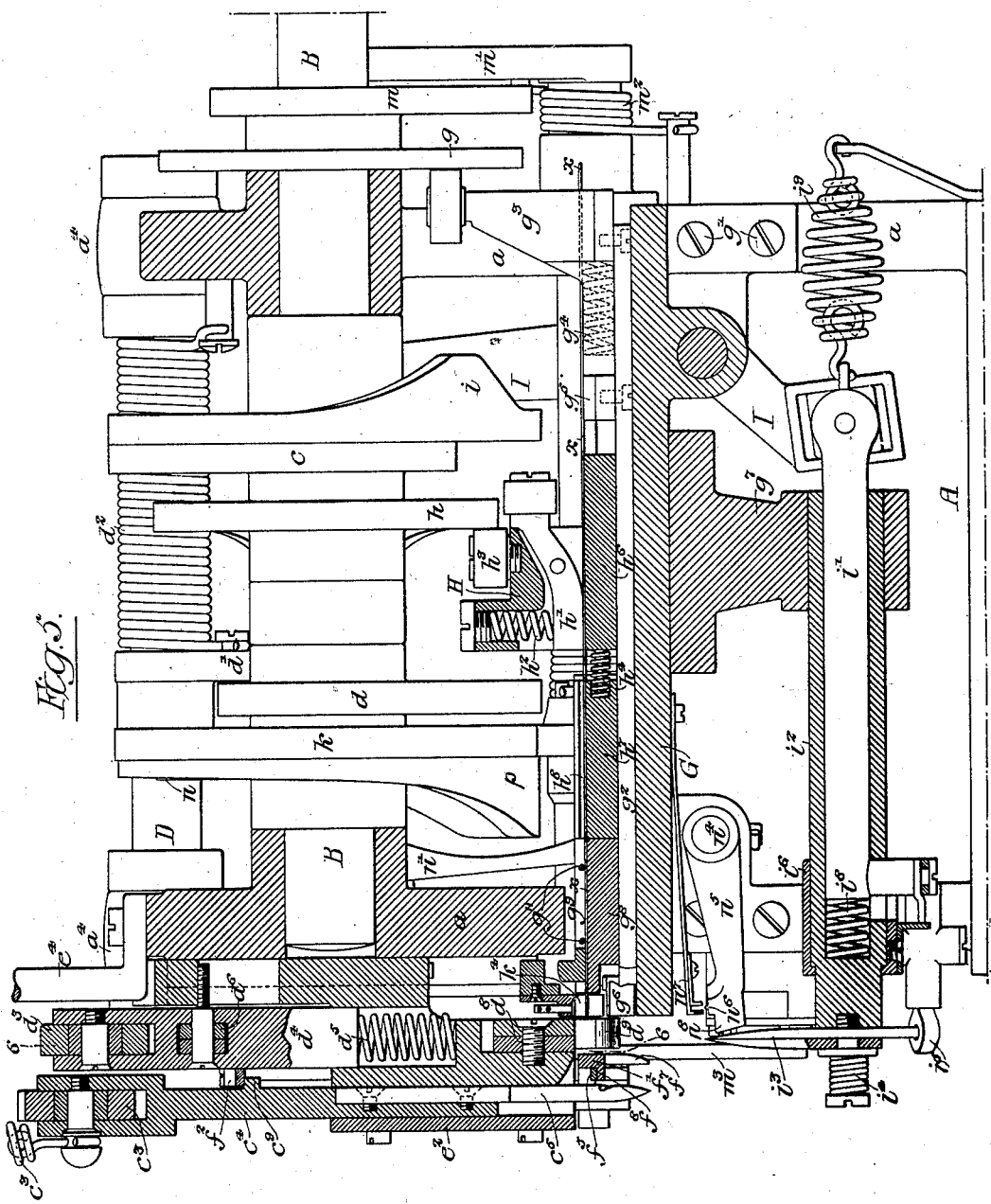
Witnesses:
Inventors:
Stephen B. Tily,
John G. Rehfuss, &
Martin O. Rehfuss,
by their Attorneys No. 702,262. Patented June 10, 1902.
S. B. TILY & J. G. & M. O. REHFUSS.
MACHINE FOR INSERTING AND FASTENING STRINGS IN LABELS.
(Application filed May 31, 1901.)
(No Model.) 7 Sheets—Sheet 5.
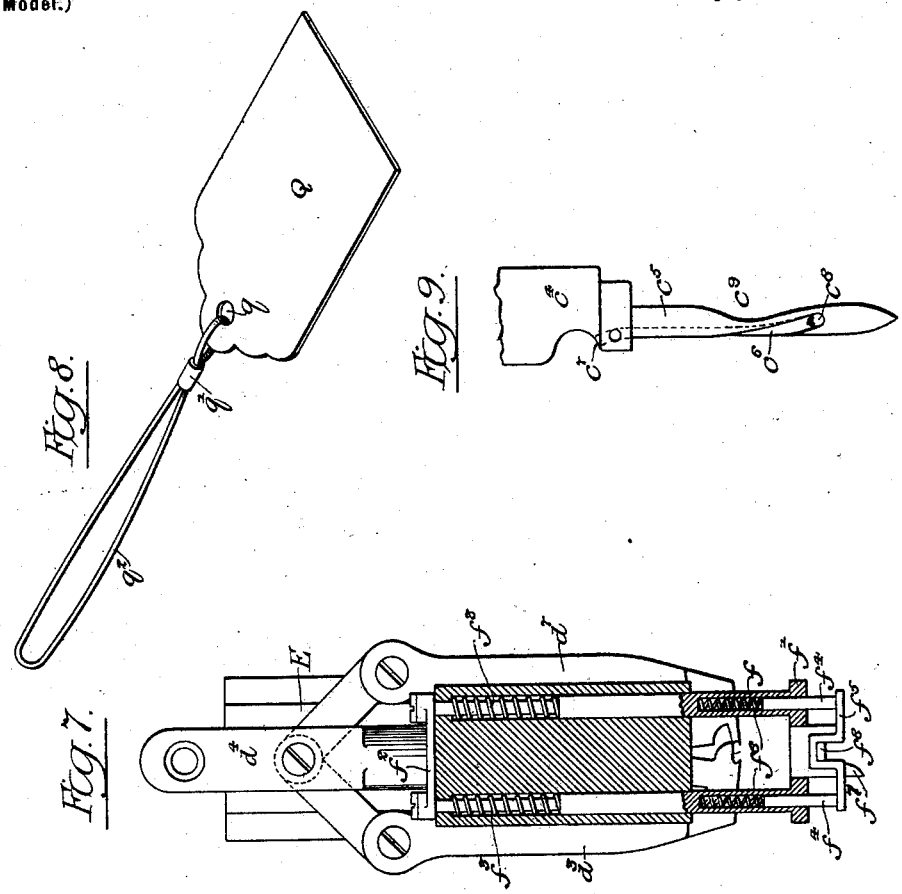
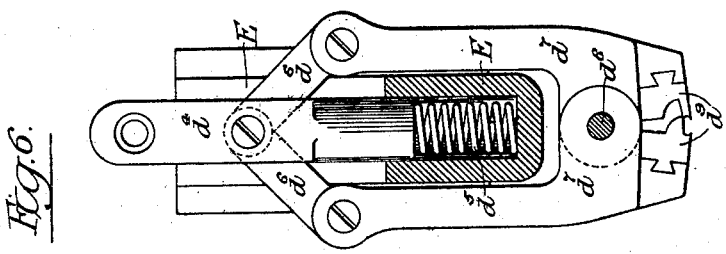

No. 702,262. Patented June 10, 1902.
S. B. TILY & J. G. & M. O. REHFUSS.
MACHINE FOR INSERTING AND FASTENING STRINGS IN LABELS.
(Application filed May 31, 1901.)
(No Model.) 7 Sheets—Sheet 6.
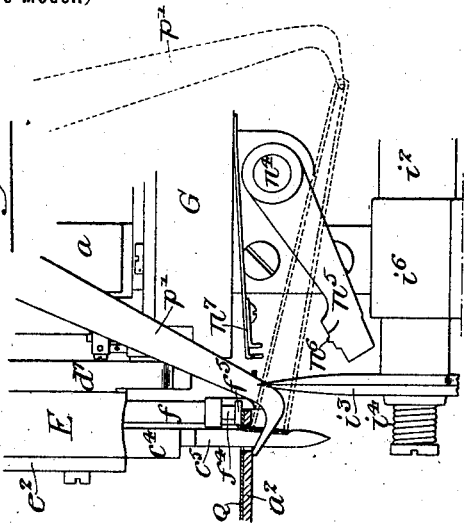
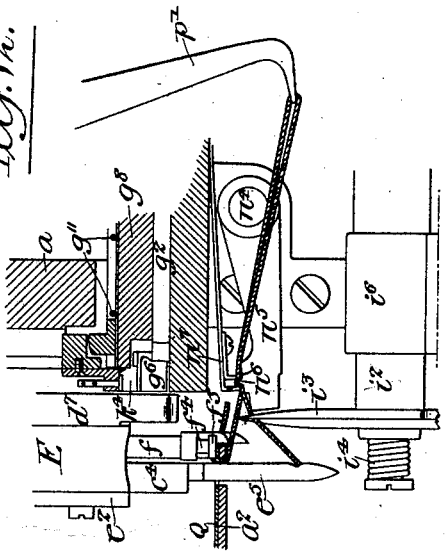
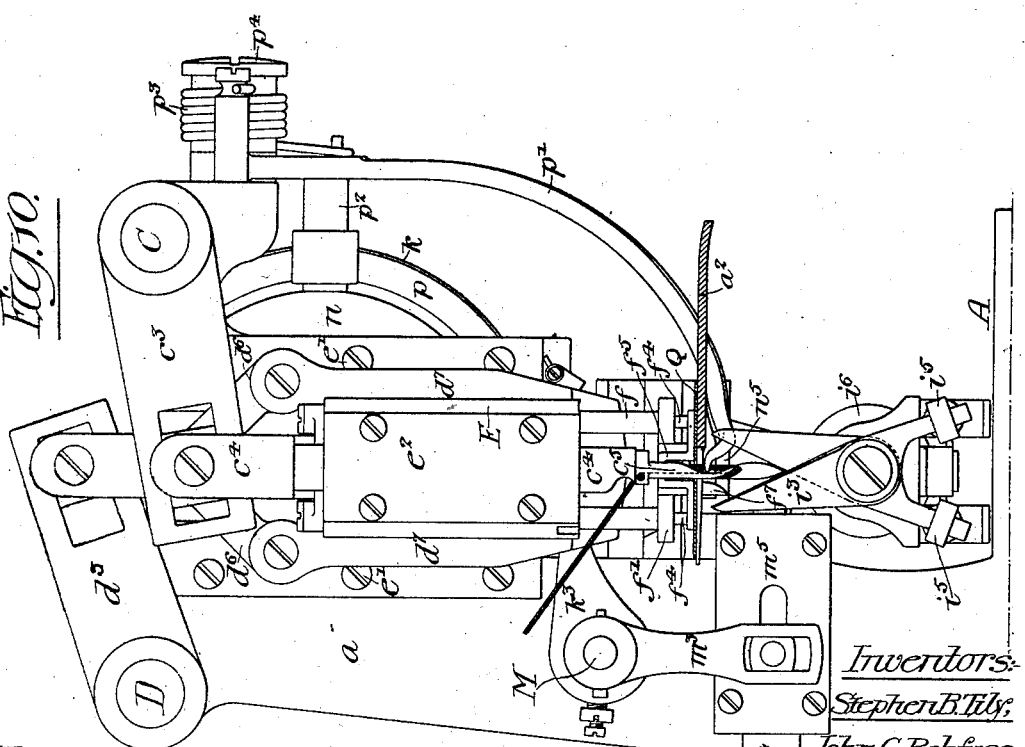
Witnesses:—
Frank L. A. Graham
Herman E. Metius
Inventors:
Stephen B. Tily,
John G. Rehfuss,
Martin O. Rehfuss,
by their Attorneys
Howson & Howson No. 702,262. Patented June 10, 1902.
S. B. TILY & J. G. & M. O. REHFUSS.
MACHINE FOR INSERTING AND FASTENING STRINGS IN LABELS.
(Application filed May 31, 1901.)
(No Model.) 7 Sheets—Sheet 7.
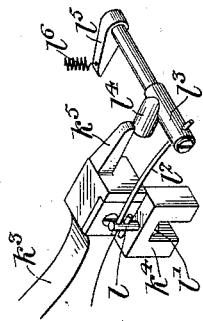
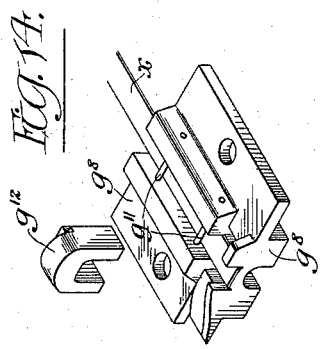
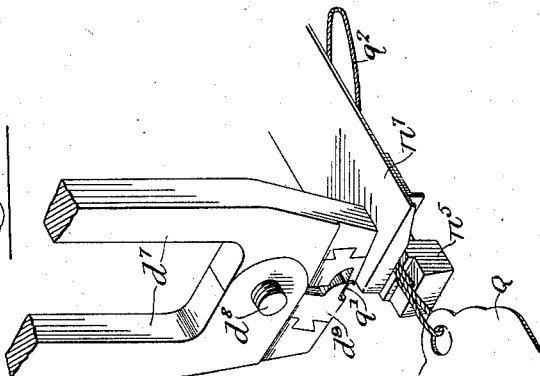
Witnesses:—
Frank L. A. Graham.
Herman E. Metius.
Inventors:—
Stephen B. Tily,
John G. Rehfuss &
Martin O. Rehfuss,
by his Attorneys;
Howson & Howson

UNITED STATES PATENT OFFICE.

STEPHEN B. TILY, JOHN G. REHFUSS, AND MARTIN O. REHFUSS, OF PHILADELPHIA, PENNSYLVANIA, ASSIGNORS TO JOHN WANAMAKER, OF PHILADELPHIA, PENNSYLVANIA.

MACHINE FOR INSERTING AND FASTENING STRINGS IN LABELS.

SPECIFICATION forming part of Letters Patent No. 702,262, dated June 10, 1902.

Application filed May 31, 1901. Serial No. 62,577. (No model.)

*To all whom it may concern:*

Be it known that we, STEPHEN B. TILY, JOHN G. REHFUSS, and MARTIN O. REHFUSS, citizens of the United States, and residents of Philadelphia, Pennsylvania, have invented certain Improvements in Machines for Inserting and Fastening Strings in Labels, of which the following is a specification.

Our invention relates to certain improvements in label-making machinery, having for its object the provision of a device for automatically inserting a string through the string-hole of a label and fastening together the ends of the same, so that it is retained therein. This object we attain as hereinafter set forth, reference being had to the accompanying drawings, in which—

Figure 1 is a view of one side of our improved machine. Fig. 2 is a view of the other side of the same. Fig. 3 is a front view. Fig. 4 is a similar view, the needle-plunger and the crimping-jaws being removed. Fig. 5 is a view, partly in section, on the line 5 5, Fig. 3. Fig. 6 is a vertical sectional view on the line 6 6, Fig. 5. Fig. 7 is a similar view on the line 7 7, Fig. 5. Fig. 8 is a perspective view of a label, showing a string in position in the string-hole. Fig. 9 is an enlarged view of the plunger with its attached needle. Fig. 10 is a front view of our improved machine, showing the threading-needle lowered, so that it passes through the hole in a label, and illustrating the arm $p'$ in the act of pulling the string out into a loop. Fig. 11 is a side view of the lower front portion of our machine, showing the position of the various parts at the same point of their operation as is illustrated in Fig. 10. Fig. 12 is a view similar to Fig. 11, being partly in section and showing the parts in the position they occupy just before the string is cut by the shears. Fig. 13 is a perspective view of the crimping-jaws and the string-holding mechanism in the position occupied just before said jaws place the piece of metallic ribbon around the string. Fig. 14 is a perspective view of the corrugating-piece, showing the ribbon-corrugating die detached; and Fig. 15 is a perspective view of the mechanism for holding a cut-off piece of ribbon in place on the anvil until it is moved forward preparatory to being grasped by the crimping-jaws.

It will be understood that while the machine hereinafter described may be used independently of other mechanism for inserting and fastening strings in labels or similar articles we preferably employ it in connection with a label-making machine described and claimed in an application for Letters Patent filed June 4, 1901, Serial No. 63,118.

In the above drawings, A is the base of the machine, at the ends of which are two standards or projections $a\ a$, there being also a horizontal projection $a'$ at the front of the machine which supports an upright piece carrying a table $a^2$. This has in it a slot $a^5$, running from a point in line with a stringing-needle, hereinafter to be described, to the edge of the table, the said needle being constructed to pass through said slot. A shaft B is supported in suitable bearings in the upright parts $a\ a$, and to it is applied the power for operating the machine. These standards $a$ are provided at their upper ends with bearings $a^3$ and $a^4$ for shafts C and D, respectively, the shaft C having pinned to it an arm $c'$, carrying a roller, which is held in engagement with a cam $c$ on the shaft B by a spring $c^2$.

To the front end of the shaft C is pinned a second arm $c^3$, slotted at the end and having a plunger $c^4$ loosely connected thereto, the said plunger moving in a slot or guide formed in a slide E, which is held to the standard $a$ by plates $e\ e$ and screws $e'$. Fastened to the plunger, as shown in Fig. 5, is a needle $c^5$ of the form shown in Fig. 9, rather bluntly pointed and having a groove $c^6$ running over its surface, and entrance and exit holes $c^7$ and $c^8$ for the string. There is a notch $c^9$ in one side of the needle for a purpose set forth hereinafter. The plunger is retained within the guide in the slide E by means of the plate $e^2$ and is normally held in an elevated position by means of the spring $e^3$, suspended from an arm $e^4$, projecting from the standard $a$ and attached to the plunger at the point of its connection with the arm $c^3$.

The shaft D has an arm $d'$ pinned to it, on which is a roller constructed to be maintained in contact with a cam $d$ on the shaft B by means of a spring $d^2$. Similarly to the shaft C there is an arm $d^3$ on the front end of the shaft D, and like it also the said arm is loosely connected to a plunger $d^4$. The lower end of this plunger fits into a recess formed in the slide E, and a spring $d^5$ in this recess always tends to elevate it. There is a slot in the upper end of this plunger $d^4$, in which are pivoted the two arms $d^6$ of the crimping-jaws $d^7$, as shown in Fig. 6. These jaws extend downwardly in grooves along the sides of the slide E, being pivoted together at $d^8$ and having crimping-dies $d^9$, of hardened metal, at their lower ends. Between the plunger $c^4$ and the jaws $d^7$ and within the slide E are vertical recesses, preferably cylindrical, in which are tubular pieces $f$, connected rigidly at the bottom by a yoke-piece $f'$ and held together at the top by a piece $f^2$. The upper portion of each piece $f$ is preferably of smaller diameter than the rest thereof, and around this diminished section is a spring $f^3$, tending always to keep the pieces $f$ in their lower position. Within the said pieces are small rods $f^4$, joined by a U-shaped piece $f^5$, normally pressed downwardly by springs $f^6$, placed as shown. The rods $f^4$ are kept from coming out of place by a horizontal projection $f^8$ from the piece $f'$, which is engaged by the U-shaped piece $f^5$, so as to allow it limited motion. Extending downwardly from the back of the yoke-piece $f'$ are two tooth-like projections $f^7$ of unequal length, placed immediately behind the piece $f^5$ and having a tapered opening between them. The top cross-piece $f^2$ is so situated that it will engage and be raised by a projection $c^9$ on the back of the plunger $c^4$ after said plunger has been raised a certain distance.

Held to the standards $a$ by screws $g'$ and extending between said standards is a piece G, having a slot in its upper face running its entire length. Extending through this slot is a rod or bar $g^2$, attached by screws at the back end of the machine to an upwardly-projecting arm $g^3$, on the end of which is a roller placed so as to engage a cam $g$ on the shaft B, there being a spring $g^4$ (indicated in dotted lines in Fig. 5) between an abutment $g^5$ and the said arm $g^3$. There is a horizontal slot in this arm, through which passes the metallic ribbon $x$ on its way toward the front of the machine. The bar $g^2$ has at its front end a block or anvil $g^6$, the same being constructed to be projected beyond the end of the piece G when the raised part of the cam $g$ engages the roller on the arm $g^3$.

H is a device for feeding forward the metallic ribbon, by which the ends of the string are to be fastened together after they have been inserted in a label, the ribbon passing through said device. As shown in Fig. 5, it consists of a hollow shell mounted to slide on the bar $g^2$, being held in position by plates $h^5$ and having a lever $h'$ pivoted within it. This lever has at one end a roller constructed to be engaged by a cam $h$ on the shaft B, the said cam depressing the roller against the pressure of a spring $h^2$, acting on the other end of the lever. To the upper surface of the shell H is fixed a roller $h^3$, placed in the path of a horizontally-projecting section of the cam $h$, whereby the shell H is moved toward the front of the machine against the action of a spring $h^4$, this latter serving to keep said roller in contact with the cam. The metallic ribbon passes between the lever $h'$ and the bottom piece $h^6$ of the shell H, and there is a guide-piece $h^7$ just in front of the piece $h^6$, in which is a groove $h^8$ for the guidance of the ribbon $x$. Extending from this piece to the plane of motion of a U-shaped shearing-piece $k^4$ is a piece $g^8$, having through it a corrugating-piece $g^9$, as shown in Fig. 14, grooved so as to give the ribbon $x$ a flattened U-shaped section as this latter is forced through it. It will be seen that the said piece is cut away in the top and back and has small rods or pins $g^{11}$ extending across it to retain the ribbon in position, while at its front end is a U-shaped die-piece, between which and the channel in the piece $g^8$ the ribbon is given its final shape.

A lever I, Figs. 1 and 2, is pivotally supported on a piece G, one of its ends being provided with a roller placed so as to be engaged by a cam $i$ and the other end being loosely connected to a bar $i'$, which slides within a tubular piece $i^2$, rigidly held to a projection $g^7$ from the piece $g$. A pair of scissor-blades $i^3$ is held by a pivot to the end of the tubular piece $i^2$, being normally retained in an open position by a spring $i^4$ and having their handles engaged by arms $i^5$, pivoted to a saddle-like piece $i^6$, fixed to the piece $i^2$. The ends of these pivoted arms are in turn connected to the end of the bar $i'$ by links which naturally are at an angle to the arms $i^5$. Springs $i^8$ and $i^9$ are provided, as shown, and also tend to keep the scissor-blades open and to cause the roller on the lever I to bear against the cam $i$.

A hollow rod K (shown best in Fig. 2) is supported in bearings in the standards $a$, the same having keyed to it an arm $k'$, carrying a roller held in contact with a circumferential cam $k$ by means of a spring $k^2$. This rod projects through the front standard $a$ and has keyed to it a second arm $k^3$, which is provided at its end with a U-shaped shearing-piece $k^4$, constructed to be forced down past a shearing edge at the end of the piece $g^8$, held just above the anvil $g^6$. The shearing-piece $k^4$ is offset from the arm $k^3$ toward the front of the machine and has a small bar $l$, which carries a head $l'$, passing through it, there being a spring-bar $l^2$, supported on a pivot $l^3$ and passing through the said bar $l$. This pivot has fixed to it a piece $l^4$, constructed to be engaged by a projection $k^5$ from the arm $k^3$, and in addition passes through the standard $a$, on the other side of which it is provided with a second arm $l^5$, held up by a spring $l^6$, as shown in Fig. 1.

Within the hollow rod K is a smaller rod M, having an arm $m'$ on its rear end and provided with a roller constructed to be pressed against the circumference of a cam $m$ by a spring $m^2$. To the forward end of the rod M is fixed an arm $m^3$, having a slot in its lower end, which loosely engages a pin projecting from the bar $m^4$. This bar slides within a guiding-piece $m^5$, being constructed to be periodically moved forward under a pivoted arm $n^5$ when said arm is elevated, and thus to firmly support said arm in its raised position. This arm, which is supported on a shaft $n^4$, has an upwardly-projecting piece $n^6$ on its face, and when in its raised position this piece fits between two downwardly-projecting edges on a flat spring $n^7$, suitably held to the piece G, the said shaft $n^4$ being provided with a second arm $n^3$, loosely fitting into the slotted end of a lever $n'$, pivoted to the front standard $a$. There is also a spring $n^2$, the ends of which are shown in Fig. 2, on the said shaft, the same tending to retain the arm $n^5$ in its lowest position. In front of the projecting part $n^6$ the upper face of the end of the arm $n^5$ is flat, forming a surface $n^8$, coacting with the ends of the crimping-jaws $d^7$. The lever $n'$ has a roller at its upper end, bearing upon a cam $n$ on the front face of the cam $k$. There is a second cam $p$ on this front face, the same having a greater diameter, and therefore being outside of the cam $n$. It engages a roller on the pin $p^2$, projecting from a lever-arm $p'$, the said arm being pivotally supported on a pin $p^4$, projecting from the front one of the bearings $a^3$ and having a spring $p^3$. This arm $p'$ curves inwardly at its lower end and is hooked, as shown, the length of the said arm and the shape of the hook being such that when the said arm is moved forward under the action of the cam $p$ the hook passes through the notch $c^9$ in the side of the needle $c^5$, this latter being in its lowest position.

The operation of our improved label-stringing machine is as follows: The shaft B is revolved at a uniform rate by power from any suitable source, and labels, for example, of the form shown at Q in Fig. 8, having a string-hole in them, are supplied periodically to the machine, being deposited and held on the table $a^2$ either by hand or by mechanical carriers. A thin metallic ribbon is inserted through the slot in the arm $g^3$ and is pushed into the opening in the rear of the shell H. Under the action of the projection on the circumference of the cam $h$ the end of the lever $h'$ is depressed and the ribbon is then fed by hand far enough to be engaged by the other end of the lever when the cam has ceased action. The horizontal projection on this same cam $h$ then acts on the roller $h^3$ to push forward the whole shell H with the ribbon $x$, after which the circumferential projection on the cam again acts and the shell is returned to its original position by the spring $h^4$, the ribbon remaining in its forward position. This intermittent feeding being continued, the ribbon is forced to enter the U-shaped channel $g^9$ in the piece $g^8$ and is finally made to pass between the pieces $g^8$ and $g^{12}$. The result of this action is to turn down the edges of said ribbon in a position at right angles to its width, it being thus given a trough-like or inverted-U-shaped section. The machine should be stopped when the forward end of the ribbon has come flush with the end of the piece $g^8$. The needle $c^5$ is then threaded with the string from which it is desired to form the loops of the labels, the said string, from a ball suitably supported, being passed in at the opening $c^7$, down through the groove $c^6$ and rearwardly through the hole $c^3$, above one-half inch being allowed to project through this hole. At the beginning of the cycle of operation performed by one revolution of the shaft B the cam $h$ moves forward the shell H with the ribbon $x$, thus causing the said ribbon to project beyond the end of the piece $g^8$. Simultaneously the cam $n$, acting through the lever $n^3$ and the arm $n'$, causes the arm $n^5$ to be lowered, whereupon the cam $p$ causes the hooked arm $p'$ to move forward, the position and dimensions of the same determining the size of the loop of string to be formed. As this arm moves the needle-plunger $c^4$, with the needle, is caused to descend by the action of the cam $c$ upon the arms $c'$ and $c^3$, and just after the needle, with the string, passes through the hole in a label properly placed on the table the hooked end of the arm $p'$ has passed between the open shears $i^3$ and reached a point beyond or just in front of the said needle, the arm $n^5$ being brought to its lowest position to allow of such action of the arm $p'$, as clearly illustrated in Figs. 10 and 11. As the needle-plunger $c^4$ has come down, the tubular pieces $f$, with their yoke-piece $f^5$, have moved down with it until their further motion was stopped by contact with the table, the projecting end of the string being caught in the tapered opening between the projections $f^7$, and passing through the small yoke $f^5$ is held tightly between the table and the projection $f^8$, the label being firmly held between the table and the yoke $f^5$. By this time the shearing-piece $k^4$ has been forced downward by the action of the cam $k$ on the arm $k'$, transmitted through the shaft K and the arm $k^3$, thus cutting off a length of metallic ribbon. The downward motion of the shearing-arm $k^3$ has brought its projecting end $k^5$ into contact with the pin or rod $l^3$, causing a partial revolution of said rod. This in turn causes the spring-arm $l^2$ to force downwardly the headed bar $l$, which engages the cut-off length of metallic ribbon and clamps it to the anvil $g^6$. By this means the severed piece of ribbon is retained in proper position in spite of the vibration of the machine, which would otherwise almost certainly cause it to change its position upon the anvil before the next step of the operation could be accomplished. The cam $g$ now acts through the arm $g^3$ and forces forward the bar $g^2$, with the anvil $g^6$ and the cut-off piece of curved ribbon, into a position directly under the open crimping-jaws $d^7$. The needle by means of its plunger is then forced farther downward until the notch therein is on the same level as the hooked end of the arm $p'$, the end of the string being held on the table edge by the action of the projections $f^7$ of the yoke $f'$ and the projection $f^8$ and extending across the notch $c^9$. This hooked arm then moves backward, passing through the notch, engaging the string and pulling it out into a loop, the said string feeding through the needle from the source of supply, as indicated in dotted lines on Fig. 11. Simultaneously with this action the crimping-jaws have closed slightly, grasping the piece of curved ribbon, the anvil immediately thereafter being returned to its normal position by springs $g^4$. There are now three sections of the string in the same plane, as shown in Fig. 13—viz., first, about a quarter of an inch of the end which extends horizontally to the rear from the back of the tapered slot between the projections $f^7$; second, the upper section or body of the loop proper, which passes from the under side of the slot in the table $a^2$ to the hooked end of the arm $p'$, and, third, the lower section of the loop returning from the said arm to the end of the needle. By the continued action of the cam $c$ on the arm $c'$ the needle is moved down still farther, and the arm $n^5$ is caused to rise, the lower section of the string-loop between the said arm and the needle thus extending sharply downward between the knives of the shears $i^3$, the various parts occupying the relative position shown in Fig. 12. Through the action of the cam $i$ upon the pivoted lever I the rod $i'$ is moved forward, thus causing each of the pieces $i^{10}$ to turn its attached arm $i^5$ on its pivot in an endeavor to increase the angle between said arm and itself. This action naturally moves the front ends of the arms $i^5$ together, and consequently moves the lower ends or handles of the shears toward one another. The said shears thus begin to close, and the arm $i^5$ continues to move upwardly until immediately after the said shears cut off the string. The arm $n^5$ clamps all three of the above-mentioned sections of string between it and the downwardly-projecting edges of the spring $n^7$ and arm $p'$, still retaining the loop in a taut condition. The shears now return to their normal open position, and the cam $d$, acting through the arms $d'$ and $d^3$, forces downward the part E after slightly compressing the spring $d^5$ and partially closing the crimping-jaws, which have the curved piece of ribbon held within their die-pieces $d^9$. The downward motion noted above is kept up until the part E is stopped by contact with the yoke-piece $f'$, which is already held tightly against the piece $f^5$ on the table $a^2$. The continued downward motion of the arm $d^3$ then operates the toggle formed by the arms $d^6$ and $d^7$, first lowering these latter until the curved ribbon within them extends directly over the three sections of string and then when the downward motion is checked by their coming against the flat surface of the arm $n^5$, closing said crimping-jaws, thus placing the ribbon over the parts of the string and tightly curling it around the same in the form of a cylinder, as shown at $q'$ in Fig. 8. By this means the two ends of the section of string cut off are clamped to the body of the same, thereby forming two loops, in the smaller of which the label is strung. Just before the jaws come in contact with the arm $n^5$ the bar $m^4$ is projected under it by the action of the cam $m$ on the arm $m'$, the said bar serving to rigidly support the arm $n^5$ during the time which the jaws are pressing upon it. As soon as the ends of the loop have been clamped together by the curled-up section of metallic ribbon the arm $p'$ relinquishes its hold upon said string, and the continued revolution of the cams on the shaft B releases the label and allows the arms $c^3$ and $d^3$, with the piece E and its attached parts, to return to their normal positions under the action of the various springs connected therewith. The finished label, with its string $q^2$, as illustrated in Fig. 8, may now be removed from the table $a^2$ either by hand or by mechanical carriers of the type described and illustrated in our application for patent No. 63,118, filed June 4, 1901.

We claim as our invention—

1. In a label-stringing machine the combination of mechanism for inserting a string through a hole in a label, means for cutting off a length of said string from a source of supply of the same, means for cutting off a piece of metallic ribbon, means for bringing the two ends of the string adjacent to a portion of the body thereof, and means for clamping the cut-off piece of said ribbon around the body and said adjacent ends of the length of string, substantially as described.

2. The combination in a label-stringing machine of mechanism for inserting a string through the hole in a label, means for cutting off a length of said string from a source of supply of the same, means for cutting off a piece of metallic ribbon and means for clamping the cut-off piece of said ribbon around the two ends of said length of string and a portion of the body thereof, with means for bringing the said ends and a portion of the body into the same plane before the ribbon is clamped in position, substantially as described.

3. The combination in a machine for stringing labels, of mechanism for inserting a string through a hole in the label, means for forming the length of said string into two loops, means for cutting off said length of string from the source of supply of the same, and means for clamping a piece of material around the body and the two ends of the said string, whereby the two loops are held together, the label being strung in one of the same, substantially as described.

4. The combination in a label-stringing machine, of mechanism for holding one end of the string, means for inserting a loop of the same through a hole in the label, means for cutting off this loop from the body of the string, means for laying the two ends and the body of the piece cut off in substantially the same plane, and means for clamping a piece of material around the three strands of the string and thereby forming two loops, substantially as described.

5. The combination in a machine for stringing labels, of mechanism for inserting a string through the hole in the label, means for holding one end of the string, means for cutting off a length of the same from a source of supply, means for holding the end of the piece cut off to the body part of the same, means for cutting off a piece of material, means for laying the two ends and the body of the piece cut off in substantially the same plane, and means for clamping the cut-off piece of material around the said three strands of the string substantially as described.

6. The combination in a machine of the character described, of a needle for inserting a string through a hole in a label, means for holding the said label, means for forming a loop in the string after it has been put through the label, means for cutting the string from the main supply of the same, mechanism for clamping a piece of material around the ends of the string, with means for tightly holding the string both in front of and behind the said clamping mechanism while it is in action, substantially as described.

7. The combination in a machine of the character described, of mechanism for cutting off and holding a piece of string, mechanism for intermittently feeding a piece of material to be clamped around the end of said string, means for corrugating said material, means for cutting a piece of it off from the main body of the same and means for clamping it around said end of the piece of string, substantially as described.

8. The combination in a label-stringing machine of the character described, of mechanism for inserting a string in a label, means for cutting off a length of said string, means for cutting off a piece of material to be used for fastening the ends of said string together with means for bringing the ends and a part of the body portion of the string adjacent to each other and under the piece of cut-off material, and means for fastening said piece of material around the said ends and the body, substantially as described.

9. The combination in a label-stringing machine, of a table, a reciprocating plunger, a stringing-needle carried thereby, mechanism actuated by said plunger for holding and retaining one end of the string, an arm for forming a loop in the string after it has been passed through a hole in the label, with means for cutting off the string from its source of supply, means for bringing the ends and a portion of the body of said string adjacent to each other, and means for clamping a piece of material around the said two ends and the body of the string, whereby two loops are formed, the label being in one of the same, substantially as described.

10. In a machine of the character described, a reciprocating plunger carrying a needle having a passage within and on one side of it, and a second passage through it from front to rear, in combination with mechanism for forming a length of string into a loop as it passes from one of the passages to the other, together with means for cutting off the said length of string from the main supply thereof, means for bringing the ends of the cut-off length adjacent to each other, and means for fastening the said ends thereof together, substantially as described.

11. The combination of a reciprocating plunger, a needle carried thereby, having one passage through its side and a second passage through it from front to rear, with a groove connecting the passages, a notch in the side of the needle, a pivoted arm having one end constructed to pass through said notch and to engage the string extending from one of said passages to the other, together with means for cutting off lengths of string, and means for fastening together the ends thereof after the said string has been inserted through the hole in the label, substantially as described.

12. In a label-stringing machine, the combination of mechanism for inserting a string through a hole in a label, means for cutting off a definite length of said string, with means for feeding a strip of material, means for periodically cutting off pieces of the same, a pair of jaws constructed to grasp one of said pieces and means for operating the same whereby they may be made to curl said piece of material around the ends and a portion of the body of the piece of string inserted through the label together with means for bringing the said three strands of the string into substantially the same plane previous to the operation of the jaws, substantially as described.

13. In a label-stringing machine, the combination of mechanism for inserting a string through a hole in a label, means for cutting off a definite length of said string, means for feeding a strip of material, means for curling the edges of the same, a knife for cutting off the strip, jaws having a curved recess in them constructed to grasp said cut-off piece of strip, and means for causing said jaws to place the piece of strip material over the ends and the body of the piece of string which had been inserted in the label, together with means for bringing the said three strands of the string into substantially the same plane previous to the operation of the jaws, substantially as described.

14. The combination in a machine having means for inserting a string in a label and for cutting off said string from its source of supply, a reciprocating shell or carriage for feeding forward a strip of material, a knife for cutting said material into pieces, an anvil on which said pieces are deposited when cut off, a pair of jaws having in them a recess, means for moving the anvil into a position in which the jaws may grasp the piece of material and means for operating the jaws whereby the said piece of material is clasped around the ends of the string substantially as described.

15. The combination in a machine of the character described, of means for inserting a string through a hole in a label, means for cutting off said string from its source of supply, jaws for clamping a piece of material around the body of the cut-off piece of string and the two ends thereof, means for holding together the three strands of the string, said means including an arm against which said jaws act when in operation and means for rigidly supporting said arm during the operation of the jaws, substantially as described.

16. In a label-stringing machine, the combination with means for inserting a string through the hole in a label and means for cutting off a length of said string from the source of supply, of means for bringing both ends and the body of said piece of string into the same plane and mechanism for fastening said ends and said body together, thereby forming two loops, the label being on one of the same, substantially as described.

17. In a machine of the character described, the combination of a table for holding a label, a needle-plunger, a slide movable in guides and in which said plunger is constructed to move, jaws pivoted together and yieldingly connected to said slide, with means for operating the needle-plunger whereby it is made to insert a piece of string in the hole in a label, means for cutting off said string from its source of supply, means for feeding and cutting off a strip of material for fastening the ends of the string, and means for operating the jaws whereby they act to curl the said piece of material around the ends of the string, substantially as described.

In testimony whereof we have signed our names to this specification in the presence of two subscribing witnesses.

STEPHEN B. TILY.
JOHN G. REHFUSS.
MARTIN O. REHFUSS.

Witnesses:
WILLIAM E. BRADLEY,
JOS. H. KLEIN.